United States Patent [19]

Brackett

[11] Patent Number: 5,445,039

[45] Date of Patent: Aug. 29, 1995

[54] CONJUGATE DRIVE MECHANISM

[76] Inventor: Douglas C. Brackett, P.O. Box 306, Portland, Me. 04112

[21] Appl. No.: 210,875

[22] Filed: Mar. 18, 1994

[51] Int. Cl.$^6$ ............................................. F16H 21/18
[52] U.S. Cl. ............................................. 74/49; 74/50; 92/138; 92/237; 184/6.5
[58] Field of Search ................. 74/44, 49, 50; 92/138, 92/157, 237; 123/55.5, 55.7; 184/6.5, 6.6

[56] References Cited

U.S. PATENT DOCUMENTS

| | | | |
|---|---|---|---|
| 5,741 | 8/1848 | McLaughlin | 74/32 |
| 19,726 | 3/1858 | Van Doren | 74/32 |
| 34,400 | 2/1862 | Barden | 74/50 |
| 116,617 | 7/1871 | McCamy | 74/32 |
| 130,371 | 8/1872 | Hendryx | 74/49 |
| 139,499 | 6/1873 | Doolittle | 74/44 |
| 185,521 | 12/1876 | Gregersen | 74/32 |
| 283,558 | 8/1883 | Baumgarten | 74/50 X |
| 347,644 | 8/1886 | Salmon | 92/138 X |
| 410,432 | 9/1889 | McKaig | 92/138 X |
| 508,387 | 11/1893 | Humphries | 74/32 |
| 637,450 | 11/1899 | Doolittle | 74/49 X |
| 671,583 | 4/1901 | Carmack | 74/32 |
| 735,743 | 8/1903 | Fowler | 384/597 |
| 762,646 | 6/1904 | Morison | 92/138 X |
| 795,244 | 7/1905 | Armstead | 74/32 |
| 813,736 | 2/1906 | Pendleton | 74/50 |
| 999,220 | 8/1911 | Harmon | 74/50 X |
| 1,151,220 | 8/1915 | Scherling | 74/435 |
| 1,156,055 | 10/1915 | Bullock | 74/435 |
| 1,349,660 | 8/1920 | Buhl | 74/50 |
| 1,505,856 | 8/1924 | Briggs | 74/50 |
| 1,508,614 | 9/1924 | Powell | 123/66 |
| 1,687,425 | 10/1928 | Briggs | 74/50 |
| 1,825,096 | 9/1931 | Schwemlein | 74/103 X |
| 2,121,214 | 6/1938 | Vandervoort | 184/6.12 |
| 2,312,057 | 2/1943 | Williams | 74/49 |
| 2,330,552 | 11/1943 | Brooks | 74/468 |
| 2,357,247 | 8/1944 | Wilkinson | 74/50 |
| 2,366,237 | 1/1945 | Clausen | 74/50 |
| 2,513,514 | 7/1950 | Poage | 74/50 |
| 2,583,050 | 1/1952 | Harrower | 251/18 |
| 2,628,602 | 2/1953 | Butterfield | 123/197 X |
| 2,797,589 | 7/1957 | Chaveneaud | 74/436 |
| 3,035,793 | 5/1962 | Ralph et al. | 74/422 X |
| 3,087,342 | 4/1963 | Caddell | 74/36 |
| 3,195,420 | 7/1965 | Johannsen | 92/74 |
| 3,205,723 | 9/1965 | Erlenbach | 74/50 |
| 3,332,303 | 7/1967 | Daugherty | 74/801 |
| 3,365,913 | 1/1968 | Shields | 64/9 |
| 3,386,429 | 6/1968 | Trammell, Jr. | 123/197 |
| 3,415,138 | 12/1968 | Rumbarger et al. | 74/409 |
| 3,424,022 | 1/1969 | Greenberg et al. | 74/409 |

(List continued on next page.)

FOREIGN PATENT DOCUMENTS

| | | |
|---|---|---|
| 336037 | 6/1920 | Germany . |
| 584082 | 8/1933 | Germany . |
| 3607422 | 3/1986 | Germany . |
| 61-241518 | 10/1986 | Japan . |
| 112767 | 10/1918 | United Kingdom . |
| 152799 | 10/1920 | United Kingdom . |
| 533047 | 2/1941 | United Kingdom . |
| 94/03740 | 2/1994 | WIPO . |

OTHER PUBLICATIONS

The CMC Scotch Yoke Engine—A Family of Engines For Automotive Use, SAE Technical Paper No. 901532, Aitken et al., Aug. 13, 1990.

The New Collins Compact Scotch Yoke Engine, Close et al., Feb. 24, 1992 SAE Technical Paper No. 920675.

New Wave Two Stroke, Scott, Popular Science, Jan. 1990.

*Primary Examiner*—Allan D. Herrmann
*Attorney, Agent, or Firm*—Ralph W. Selitto, Jr.

[57] ABSTRACT

A scotch yoke type motion converter employs a shuttle movable in a reciprocating fashion along a rectilinear path and having an aperture therein. One side of the aperture is defined by a first trackable profile and an opposite side of the aperture is defined by a second trackable profile. A pair of conjugate drivers is rotatably mounted on a crankpin positioned within the aperture of the shuttle. The conjugate drivers have tracking profiles which are in meshing engagement with the trackable profiles of the shuttle. Each of the tracking profiles has an overhanging portion which overhangs the opposite conjugate driver.

18 Claims, 9 Drawing Sheets

U.S. PATENT DOCUMENTS

| | | | |
|---|---|---|---|
| 3,789,956 | 2/1974 | Neugebauer | 184/6.12 |
| 3,822,607 | 7/1974 | Tharaldsen | 74/468 |
| 3,827,237 | 8/1974 | Linder et al. | 60/274 |
| 3,901,100 | 8/1975 | Iida et al. | 74/530 |
| 3,945,358 | 3/1976 | Collins | 123/56 AA |
| 3,961,607 | 6/1976 | Brems | 123/78 R |
| 4,013,048 | 3/1977 | Reitz | 123/56 BC |
| 4,073,196 | 2/1978 | Dell | 74/52 |
| 4,173,845 | 11/1979 | Heesch | 49/350 |
| 4,270,395 | 6/1981 | Grundy | 74/49 |
| 4,331,108 | 5/1982 | Collins | 123/50 R |
| 4,339,960 | 7/1982 | Senft | 74/50 |
| 4,355,542 | 10/1982 | Tsutsumi et al. | 74/467 |
| 4,370,901 | 2/1983 | Bolen | 74/44 X |
| 4,408,578 | 10/1983 | Konther et al. | 123/56 R |
| 4,457,505 | 2/1984 | Peterson | 74/467 |
| 4,459,945 | 7/1984 | Chatfield | 123/56 C |
| 4,463,710 | 8/1984 | McWhorter | 123/48 B |
| 4,485,768 | 12/1984 | Heniges | 123/48 B |
| 4,485,769 | 12/1984 | Carson | 123/61 R |
| 4,512,291 | 4/1985 | Kirk | 123/56 BC |
| 4,543,919 | 10/1985 | Carson | 123/56 BC |
| 4,565,167 | 1/1986 | Bryant | 123/70 R |
| 4,573,373 | 3/1986 | Shimizu et al. | 74/468 |
| 4,584,972 | 4/1986 | Jayne et al. | 123/56 C |
| 4,590,812 | 5/1986 | Brackett | 74/55 |
| 4,598,672 | 7/1986 | Jayne et al. | 123/56 BC |
| 4,658,768 | 4/1987 | Carson | 123/56 BC |
| 4,685,342 | 8/1987 | Brackett | 74/50 |
| 4,696,201 | 9/1987 | Hattori et al. | 74/467 |
| 4,715,326 | 12/1987 | Thring | 123/568 X |
| 4,722,239 | 2/1988 | Fleck et al. | 74/435 |
| 4,741,220 | 5/1988 | Watanabe et al. | 74/468 X |
| 4,776,229 | 10/1988 | Zona | 74/424.8 R |
| 4,779,472 | 10/1988 | Brackett | 74/50 |
| 4,803,890 | 2/1989 | Giuliani et al. | 74/131 |
| 4,856,917 | 8/1989 | Schröder et al. | 384/550 |
| 4,884,536 | 12/1989 | Neale et al. | 123/197 AC |
| 4,887,560 | 12/1989 | Heniges | 123/78 F |
| 4,905,535 | 3/1990 | Ludwig et al. | 74/668 |
| 4,915,019 | 4/1990 | Horaguimian | 92/136 |
| 4,932,373 | 6/1990 | Carson | 123/197 AC |
| 4,977,864 | 12/1990 | Grant | 123/50 B |
| 4,979,427 | 12/1990 | Pfeffer | 92/60.5 |
| 4,995,354 | 2/1991 | Morikawa | 123/65 V |
| 5,090,265 | 2/1992 | Slocum | 74/424.8 R |
| 5,109,728 | 5/1992 | Muszak | 74/74 |
| 5,259,256 | 11/1993 | Brackett | 74/49 |
| 5,265,564 | 11/1993 | Dullaway | 123/70 R |
| 5,351,567 | 10/1994 | Brackett | 74/49 |

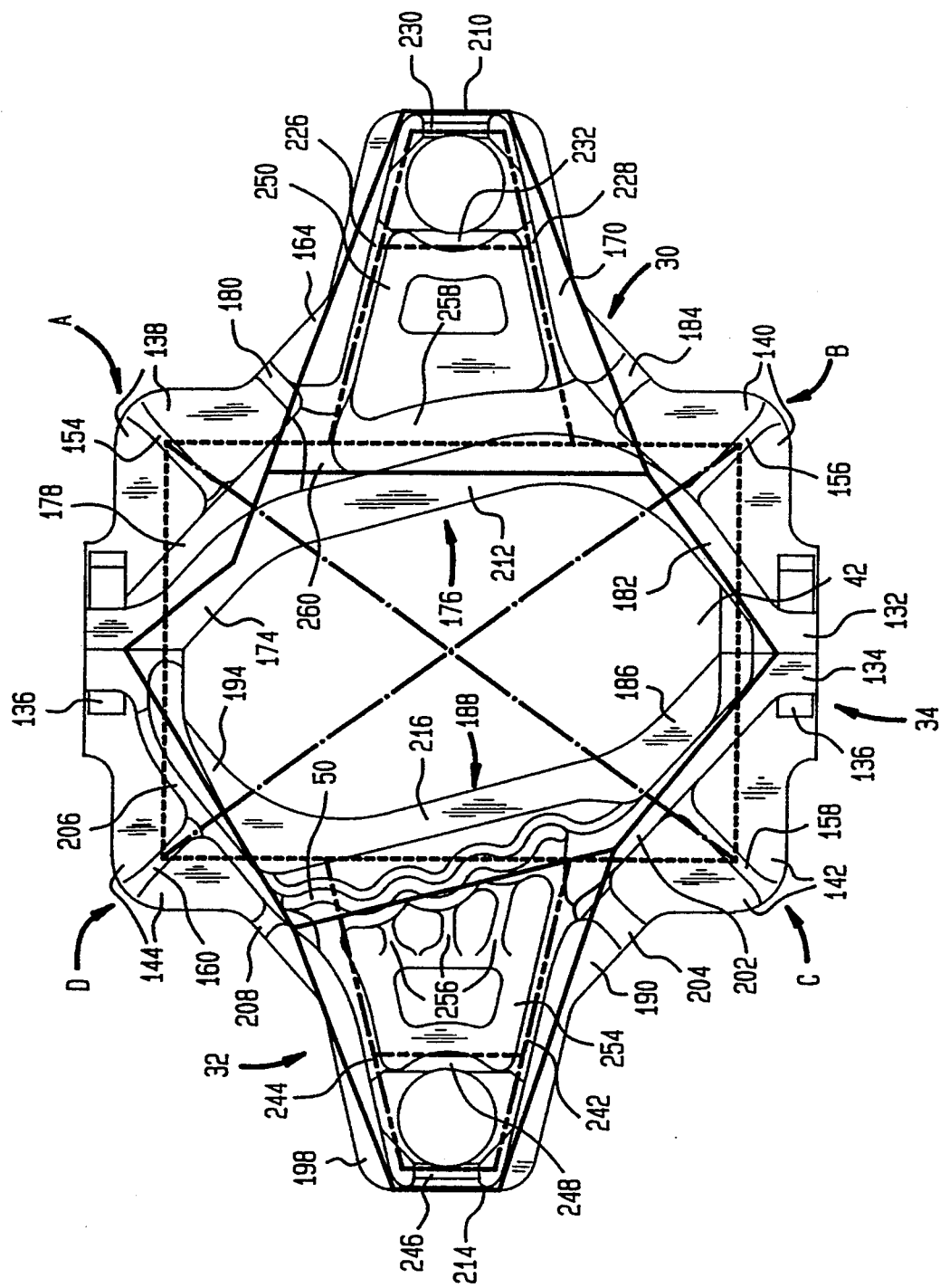

CONJUGATE DRIVE MECHANISM

FIELD OF THE INVENTION

The present invention relates to devices for converting linear motion to rotary motion and vice versa, and, more particularly, to a scotch yoke type device having a conjugate drive mechanism. As used herein, the term "conjugate drive mechanism" shall connote a combination of at least two mechanical components (i.e., a "conjugate driver" and a "bearing conjugate") adapted to mesh or engage in conjugation with each other, such as through the provision of meshable tracking profiles (i.e., undulations), during the operation of an associated motion converter which functions to convert rotary motion to rectilinear motion and vice versa.

BACKGROUND OF THE INVENTION

The scotch yoke has been used for many years as a means for converting reciprocating linear movement to rotary motion and vice versa. It has found application in a variety of machines, such as motors, pumps, and compressors which utilize a piston articulated within a closed cylinder (see, e.g., U.S. Pat. Nos. 283,558; 813,736; 999,220; and 2,628,602), as well as in compactors, pumps, punch presses, robots, sewing machines, generators, and material handlers.

The essential components of a scotch yoke are a crankpin rotated about a crankshaft center at an axial offset and a shuttle having a slot therein through which the crankpin is positioned. The motion of the shuttle is constrained to a linear path by a guide, frequently, a pair of opposing parallel guide surfaces. The crankshaft and crankpin move in rotary motion and may be either the driven elements or the driving elements. The shuttle moves in rectilinear motion and likewise may be the driven element or the driving element. Thus, the scotch yoke provides a means for converting linear to rotary motion and vice versa.

The slot within the shuttle must be at least as wide as the crankpin diameter and long enough to accommodate the crankpin dimension and its travel. A pair of competing objectives in the design of scotch yokes is to eliminate friction, as well as clearance at the crankpin/slot interface. Friction results in energy loss in the conversion from linear to rotary motion or vice versa and also in wear of the scotch yoke. Clearance at the interface results in a loss of motion translation, commonly called "backlash", when converting from rotary to linear motion and vice versa (i.e., there is no translation during traversal of the clearance gap), and in brinelling, spalling and vibrations when the unrestrained driving element accelerates across the clearance gap and collides into the driven element. As has been recognized for many years, clearance and friction at the slot/crankpin interface cause energy inefficiency and excessive wear and tear.

U.S. Pat. No. 4,685,342 to Douglas C. Brackett, the inventor herein, discloses a scotch yoke type motion converter having a pair of opposing, offset bearing surfaces, one on either side of the crankpin slot in the shuttle. A corresponding pair of roller bearings is arranged on the crankpin, the bearing members being coaxially and laterally displaced from one another such that each aligns with a corresponding one of the bearing surfaces of the slot within which the crankpin is positioned. In this manner, clearance at the crankpin/slot interface can be minimized to manufacturing tolerances and friction is reduced to the rolling friction of a roller bearing.

U.S. Pat. No. 5,259,256 to Douglas C. Brackett, the inventor herein, discloses a scotch yoke type motion converter having a pair of opposing gear racks provided with mating profiles, one on each side of a crankpin slot in the shuttle. A corresponding pair of pinion sectors, each of which has a tracking profile, is arranged on a crankpin. The pinion sectors are diametrically opposed to each other such that each of the tracking profiles engages a corresponding one of the mating profiles of the gear racks. In this manner, not only can clearance at the crankpin/slot interface be minimized to manufacturing tolerances, but also the load bearing capacity of the motion converter can be increased due to increased area contact between the gear racks and pinion sectors.

Whereas different motion translation applications have varying requirements with respect to loading stresses, materials, cost, etc., it remains an objective in the art to create new scotch yoke designs having alternative structural and functional characteristics while achieving energy efficiency and wear resistance. It is therefore an object of the present invention to provide an alternative scotch yoke type motion converter which tends to simultaneously minimize clearance and friction between the crankpin and the shuttle slot while maximizing the load bearing capacity of the motion converter.

SUMMARY OF THE INVENTION

The problems and disadvantages associated with conventional scotch yoke type motion converters utilized for translating rotary to linear motion and vice versa are overcome by the present invention which includes a shuttle movable in a reciprocating fashion along a rectilinear path and having an aperture therein. One side of the aperture is defined by a first trackable profile and an opposite side of the aperture is defined by a second trackable profile. The present invention also includes a rotatable crankshaft having a crankpin positioned within the aperture of the shuttle and rotatable in a circular path. A pair of conjugate drivers is rotatably mounted on the crankpin by a corresponding pair of mounting means positioned on opposite sides of an imaginary plane which passes through the crankpin and which is oriented normal to a longitudinal axis of the crankpin. One of the conjugate drivers includes a first tracking profile having a first profiled portion positioned on one side of the imaginary plane and a second profiled portion positioned on an opposite side of the imaginary plane, whereby the second profiled portion of the first tracking profile overhangs the other of the conjugate drivers. The other conjugate driver includes a second tracking profile having a first profiled portion positioned on the opposite side of the imaginary plane and a second profiled portion positioned on the one side of the imaginary plane, whereby the second profiled portion of the second tracking profile overhangs the one conjugate driver. The first and second tracking profiles engage the first and second trackable profiles, respectively, in a continuous conjugating manner as the crankpin rotates in the circular path, whereby the reciprocating rectilinear motion of the shuttle is continuously converted into the rotary motion of the crankpin or vice versa.

An additional feature of the present invention is a lubrication system for lubricating a conjugate drive mechanism, the lubrication system including retaining means for retaining lubricating fluid between a tracking profile and a trackable profile. Another feature of the present invention involves utilizing a plurality of ribs and webs to reinforce the shuttle. In accordance with yet another feature of the present invention, a pair of castled pistons is formed monolithically with the shuttle at opposing ends thereof.

BRIEF DESCRIPTION OF THE DRAWINGS

For a better understanding of the present invention, reference is made to the following description of various exemplary embodiments of the invention considered in conjunction with the accompanying drawings, in which:

FIG. 9 is an opposite side elevational view of the shuttle shown in FIG. 8;

DESCRIPTION OF THE EXEMPLARY EMBODIMENT

Although the present invention is applicable to any machine which utilizes a scotch yoke, examples of which are mentioned above, it is particularly suitable for use in connection with a reciprocating piston device, such as an internal combustion engine or a compressor. Accordingly, the present invention will be described hereinafter in terms of its application to a reciprocating piston device. It should be understood, however, that the following description is only meant to be illustrative of the present invention and is not meant to limit the scope of the present invention which has applicability to other types of motion converters.

Figure 1:
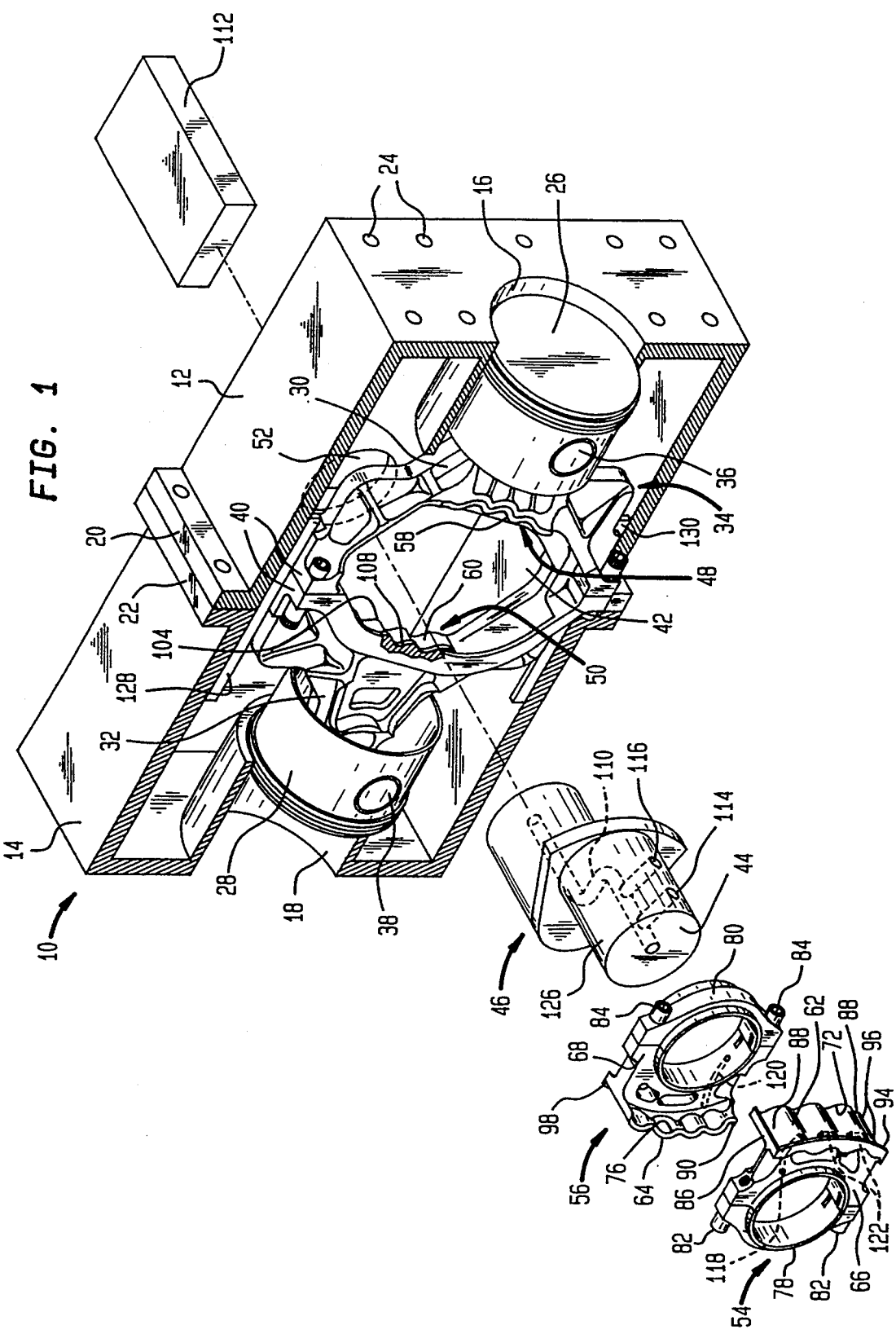
FIG. 1 is an exploded, cutaway, perspective view of a reciprocating piston device employing a first exemplary embodiment of the present invention.

FIG. 1 shows a piston device 10 with a pair of cylinder blocks 12, 14, each of which has a cylinder bore 16 and 18, respectively. The cylinder blocks 12, 14 would be joined together via opposing flanges 20, 22 by bolts etc. or by studs extending through the blocks and projecting from holes 24 for securing a cylinder head (not shown) via suitable nuts (not shown) as would be conventional in constructing cylinder blocks with opposed cylinders. The cylinder bores 16 and 18 receive corresponding pistons 26 and 28 which are mounted upon the terminal ends of extensions 30 and 32 of a shuttle 34 by wrist pins 36 and 38 or other conventional means. The extensions 30 and 32 emanate from a common yoke portion 40 of the shuttle 34.

The yoke portion 40 is provided with an aperture 42 which accommodates a crankpin 44 of a crankshaft 46. The internal peripheral boundary of the aperture 42, instead of simply being a smooth slot, includes a pair of bearing conjugates 48 and 50 integrated to either side thereof. Alternatively, the bearing conjugates 48, 50 may be a pair of discrete elements, each being bolted to the shuttle 34. It should be appreciated that while the aperture 42 passes completely through the shuttle 34, it is possible to replace the aperture 42 with a recess or blind hole. For example, in the device shown in FIG. 1, if the yoke portion 40 were closed by a continuous metal surface on the side closest to the viewer, a recess facing toward bearing opening 52 would be formed. This recess could accommodate the free end of the crankpin 44. The use of the aperture 42 is beneficial because it permits the crankshaft 46 to project through the shuttle 34, whereby additional bearings and crankpins may be made a part thereof, such as, for example, to cooperate with another set of adjacent pistons.

The crankpin 44 has a pair of conjugate drivers 54, 56 rotatably associated therewith when the crankshaft 46 is in place in the bearing opening 52, as is more clearly shown in FIGS. 2-5. With the crankshaft 46 positioned within the opening 52 and the crankpin 44, including the conjugate drivers 54, 56, positioned within the aperture 42 of the yoke portion 40, the conjugate drivers 54, 56 mesh with the bearing conjugates 48, 50, respectively, which capture the crankpin 44 and the conjugate drivers 54, 56 therebetween. More particularly, the bearing conjugates 48, 50, which include mating profiles (i.e., undulations) 58, 60, respectively, formed on tracking surfaces thereof, and the conjugate drivers 54, 56, which include tracking profiles (i.e., undulations) 62, 64, respectively, formed on tracking surfaces thereof, mesh together in conjugation throughout the range of motion of the piston device 10; and, thus, they cooperate to form a conjugate drive mechanism as that term is defined herein. The crankpin 44 is isolated from contact with the periphery of the yoke portion 40 and instead bears upon bearing portions 66, 68 of the conjugate drivers 54, 56, respectively. As can be appreciated, this arrangement prevents the crankpin 44 from bearing upon the yoke portion 40 directly and permits the fitting of the crankpin 44 to the aperture 42 within manufacturing tolerances.

Figure 7:
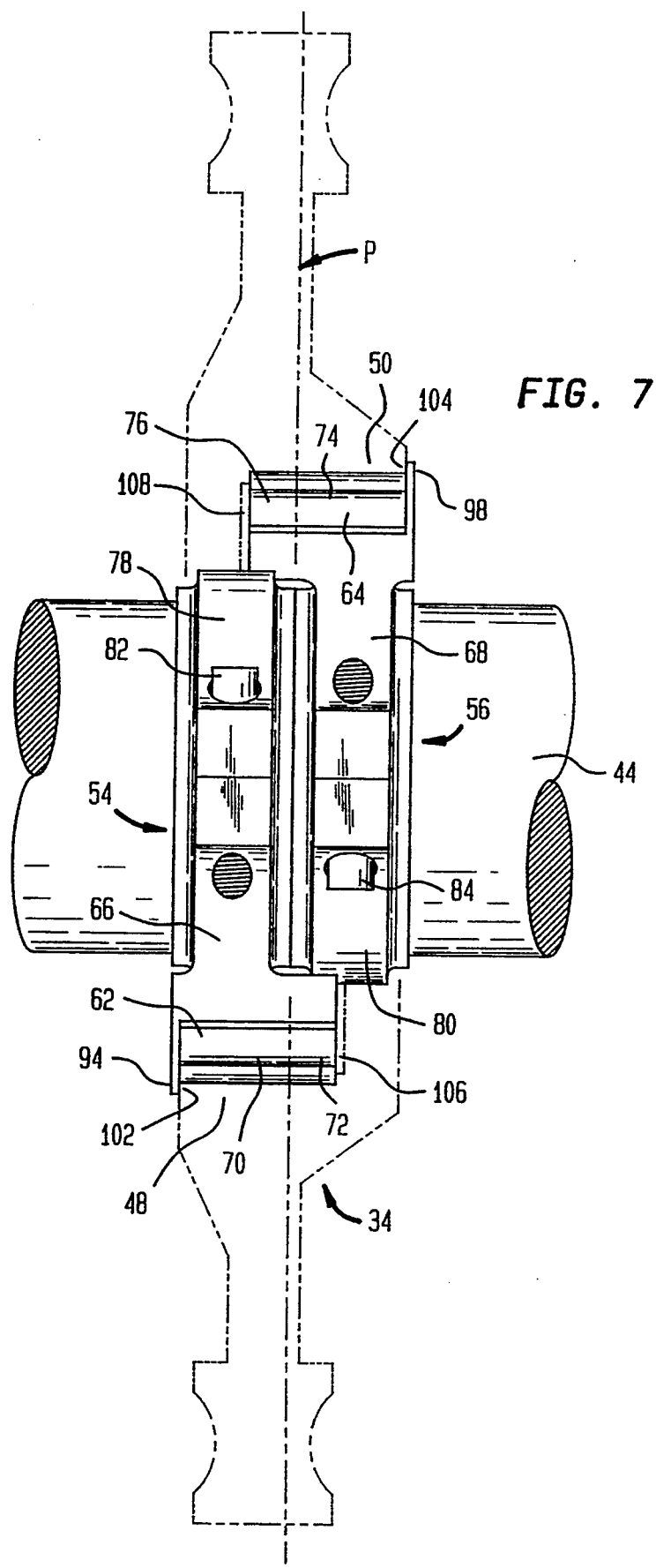
FIG. 7 is a top view showing a pair of conjugate drivers mounted side-by-side on a crankpin, an associated shuttle being shown in phantom.

Referring to FIG. 7, the bearing portions 66, 68 of the conjugate drivers 54, 56, respectively, are positioned alongside each other (i.e., side-by-side) on the crankpin 44. More particularly, the bearing portion 66 of the conjugate driver 54 is placed on a side of an imaginary plane P, which is substantially perpendicular to the axis of the crankpin 44, while the bearing portion 68 of the conjugate driver 56 is placed on an opposite side of the plane P. The tracking profile 62 of the conjugate driver 54 includes an unilateral portion 70 on the side of the plane P where the bearing portion 66 is positioned and an overhanging portion 72 on the other side of the plane P. Similarly, the tracking profile 64 of the conjugate driver 56 incudes an unilateral portion 74 on the side of the plane P where the bearing portion 68 is positioned and an overhanging portion 76 on the other side of the plane P. More specifically, the overhanging portion 72 of the tracking profile 62 overhangs the bearing portion 68 and the unilateral portion 74 of the conjugate drive 56 while the overhanging portion 76 of the tracking profile 64 overhangs the bearing portion 66 and the unilateral portion 70 of the conjugate drive 54. The unilateral portion 70 together with the overhanging portion 72 engages the mating profile 58 of the bearing conjugate 48 while the unilateral portion 74 together with the overhanging portion 76 engages the mating profile 60 of the bearing conjugate 50. Retaining caps 78, 80, respectively, are provided to removably mount the conjugate drivers 54, 56 via bolts 82, 84, respectively, or other conventional means on the crankpin 44 while permitting rotation relative thereto.

Figure 6:
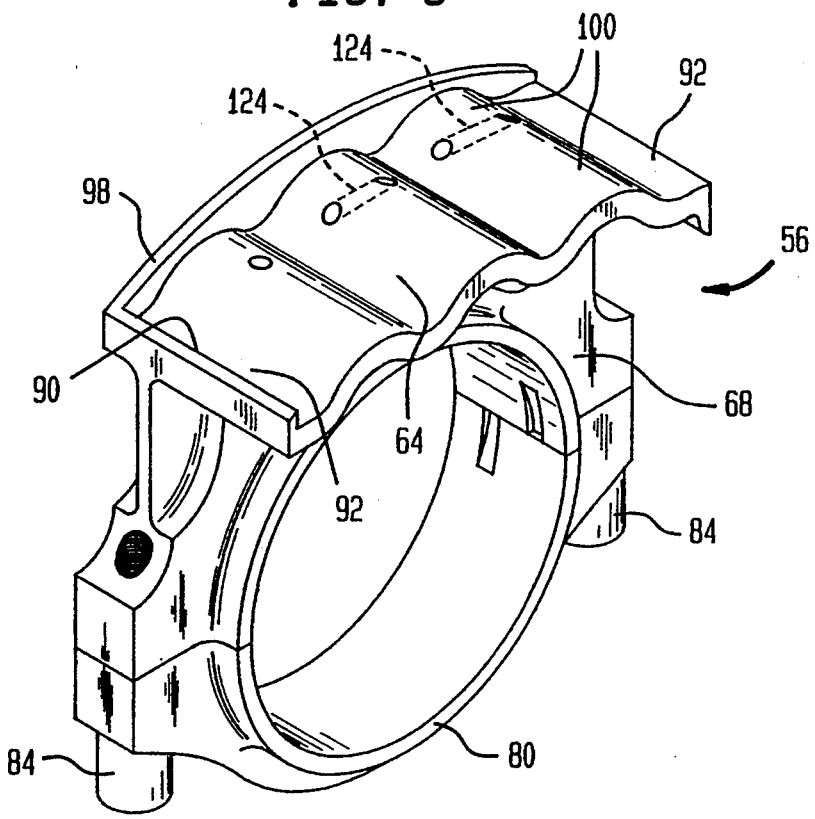
FIG. 6 is a perspective view of a conjugate driver employed by the embodiment illustrated in FIG. 1.

Referring to FIGS. 1 and 6, the tracking profile 62 of the conjugate driver 54 includes an end retaining wall 86 at one of lateral ends 88 thereof while the tracking profile 64 of the conjugate driver 56 includes an end retaining wall 90 at one of lateral ends 92 thereof. Similarly, the tracking profiles 62 also includes a side retaining wall 94 at one of axial ends 96 thereof while the tracking profile 64 includes a side retaining wall 98 at one of axial ends 100 thereof. When the conjugate driver 54 is in engagement with the bearing conjugate 48, at least some portion of the side retaining wall 94 is in engagement with a side portion 102 of the bearing conjugate 48 to assist in guiding the conjugate driver 54 in alignment with the shuttle 34 throughout the range of motion of the piston device 10 (see FIGS. 2–5 and 7), the side portion 102 forming a portion of an outer periphery of the shuttle 34. Likewise, when the conjugate driver 56 is in engagement with the bearing conjugate 50, at least some portion of the side retaining wall 98 is in engagement with a side portion 104 of the bearing conjugate 50 to assist in guiding the conjugate driver 56 in alignment with the shuttle 34 throughout the range of motion of the piston device 10 (see FIG. 7), the side portion 104 forming a portion of an outer periphery of the shuttle 34. It should be noted that the bearing conjugates 48, 50 may be equipped with grooves to receive the end retaining walls 86, 90, respectively.

Referring to FIGS. 1–5 and 7, the bearing conjugate 48 includes a side retaining wall 106 at a side portion thereof opposite the side portion 102 while the bearing conjugate 50 includes a side retaining wall 108 at a side portion thereof opposite the side portion 104. Referring to FIGS. 1 and 7, when the conjugate driver 54 is in engagement with the bearing conjugate 48, at least some portion of the side retaining wall 106 of the bearing conjugate 48 is in engagement with the other axial end 96 of the conjugate driver 54, opposite the axial end 96 where the side retaining wall 94 is positioned, to assist in guiding the conjugate driver 54 in alignment with the shuttle 34 throughout the range of motion of the piston device 10. Likewise, when the conjugate driver 56 is in engagement with the bearing conjugate 50, at least some portion of the side retaining wall 108 of the bearing conjugate 50 is in engagement with the other axial end 100 of the conjugate driver 56, opposite of the axial end 100 where the side retaining wall 98 is positioned, to assist in guiding the conjugate driver 56 in alignment with the shuttle 34 throughout the range of motion of the piston device 10.

It should be noted that the present invention is not intended to be restricted to any particular form of conjugate driver and bearing conjugate. For example, FIGS. 1–5 depict concentric wave-profile conjugate drivers 54, 56 and mating wave-profile bearing conjugates 48, 50 which have a compound curve pitch line, inclined and declined from the perpendicular of the direction of the reciprocating motion of the shuttle 34. The above described patent of the inventor herein, U.S. Pat. No. 5,259,256, discloses a variety of conjugate driver shapes and mating bearing conjugate profiles, which said application is incorporated herein by reference.

Referring to FIG. 1, in order to lubricate the conjugate drive mechanism, the piston device 10 is provided with a lubrication system including a gallery 110 which extends longitudinally through the crankshaft 46 and the crankpin 44 and which forms a conduit for lubricating fluid supplied under pressure from a source, such as a pump 112. The crankpin 42 has bores 114, 116 communicating with the gallery 110 and extending radially outwardly from the gallery 110. The conjugate drivers 54, 56 have orifices 118, 120, respectively, extending therethrough from the bearing portions 66, 68 to the tracking profiles 62, 64, respectively. The orifice 118 is positioned such that it is alignable with the bore 114 as the crankshaft 46 rotates and the conjugate driver 54 pivot about the crankpin 44, for a purpose to be described hereinafter, while the orifice 120 is positioned such that it is alignable with the bore 116 as the crankshaft 46 rotates and the conjugate driver 56 pivot about the crankpin 44, for a purpose to be described hereinafter. Referring to FIGS. 1 and 6, the conjugate drivers 54, 56 are provided with a plurality of channels 122, 124, respectively, interconnecting valleys of the undulations thereof, for purposes to be discussed hereinafter.

Figure 2:
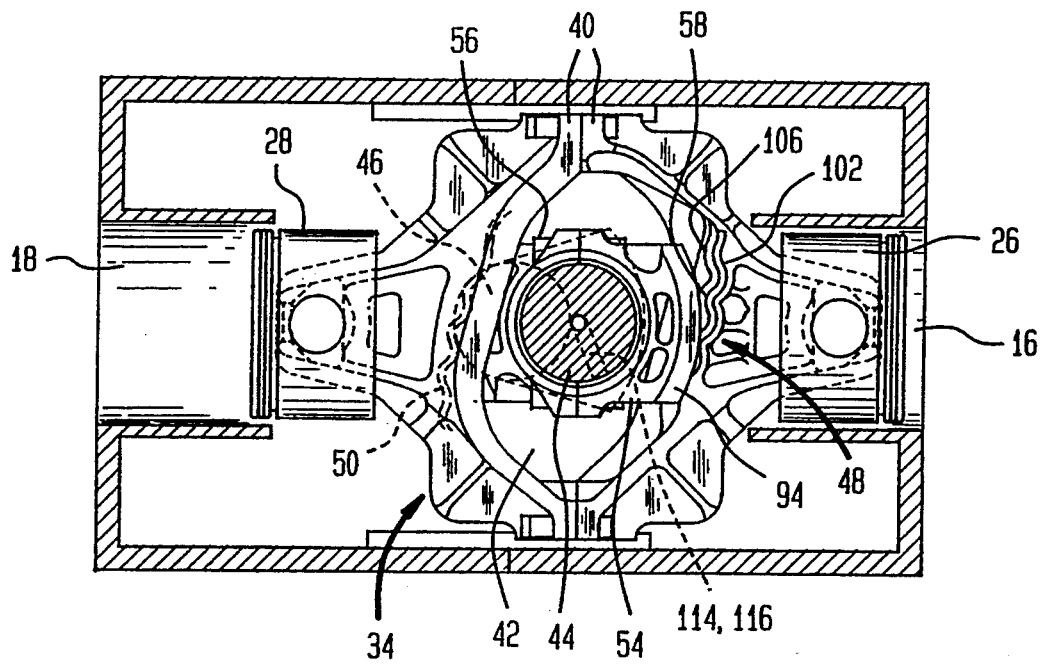
FIGS. 2-5 are a series of schematic elevational views of the embodiment illustrated in FIG. 1 as it is moved through a portion of its range of motion.
Figure 3:
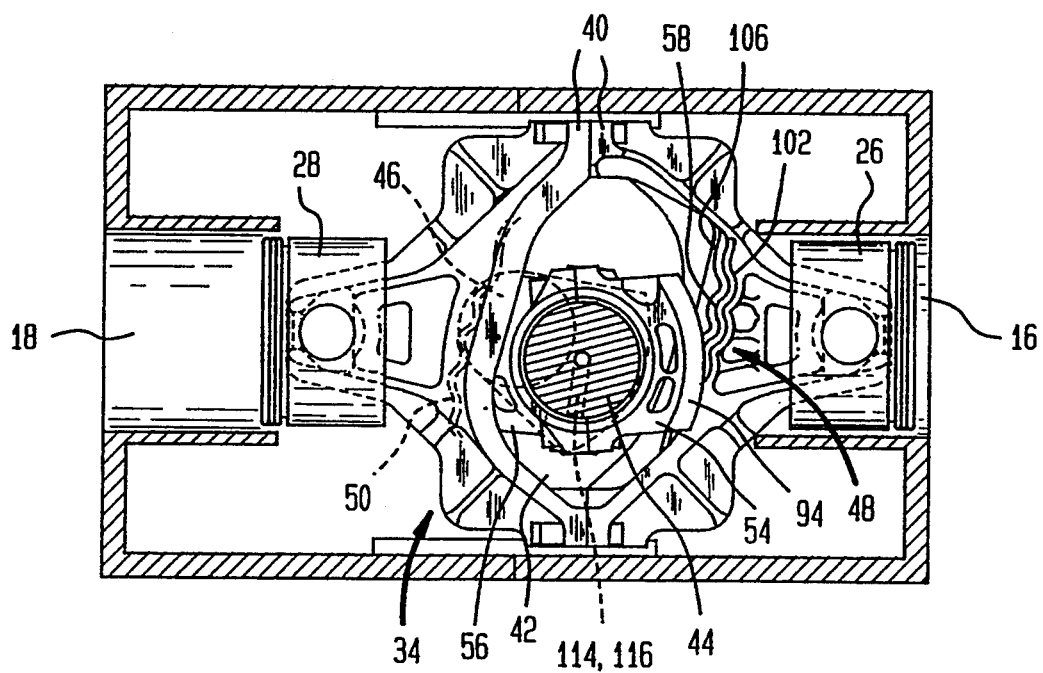
Figure 4:
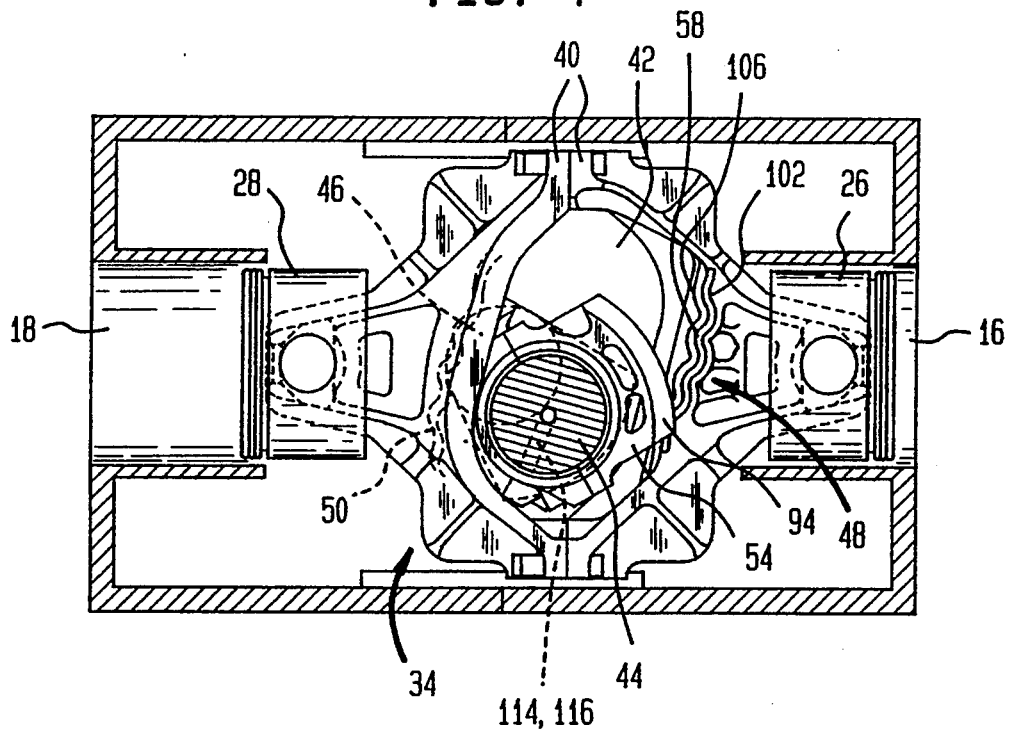
Figure 5:
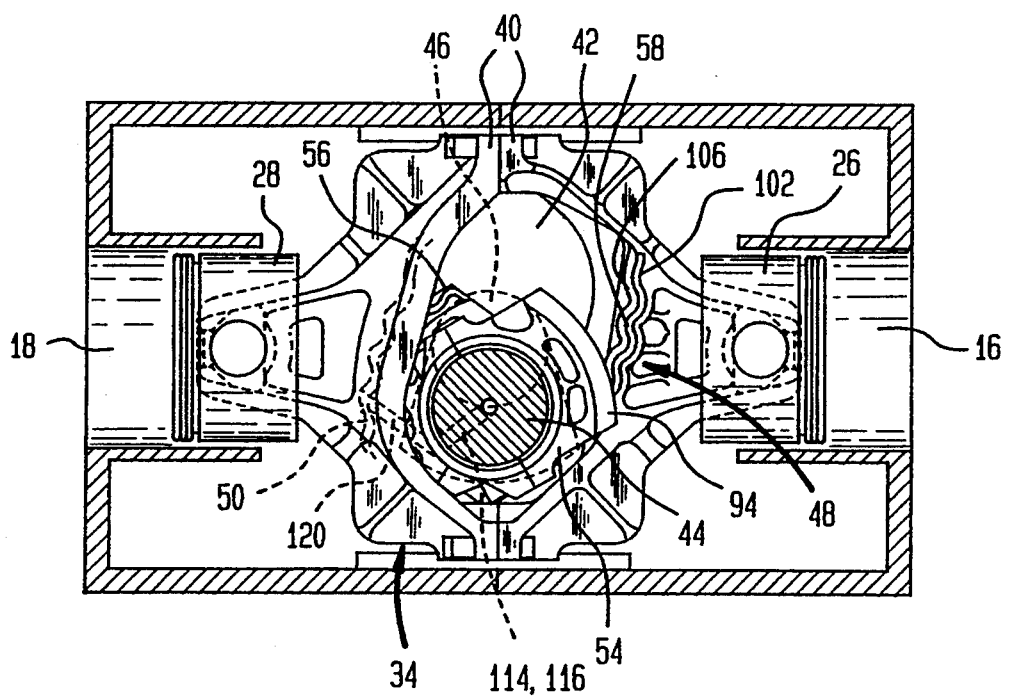

The operation of the present invention is similar to the operation of an engine constructed in accordance with the teachings of applicant's copending U.S. patent application Ser. No. 08/149,032, filed Nov. 8, 1993, the specification of which is incorporated herein by reference. FIGS. 2–5 show the present invention at four different positions during the travel of the crankshaft 46 through 90 degrees of rotation. FIG. 2 shows the crankpin 44 at 0 or 360 degrees relative to the axis of the cylinders 16, 18. FIG. 3 shows the crankpin 44 at 30 degrees beyond the axis of the cylinders 16, 18. In FIG. 4, the crankpin 42 is at 60 degrees beyond the axis, and, in FIG. 5, the crankpin 44 has progressed 90 degrees beyond the axis.

As the crankshaft 46 rotates, the crankpin 44 moves up and down within the yoke portion 40 relative to the axis of the cylinders 16, 18 (i.e., in a vertical direction). The horizontal component of crankpin 44 motion is translated into the rectilinear motion of the shuttle 34. The crankpin 44 is captured by the bearing portions 58, 60 of the conjugate drivers 54, 56 and is therefore prevented from contacting the interior periphery of the aperture 42. The conjugate drivers 54, 56 pivot about the crankpin 44 as the crankshaft 46 rotates, the bearing conjugates 48, 50 being immovable in the direction perpendicular to the linear path of the shuttle 34 and the pistons 26, 28. The conjugate drivers 54, 56 pivot in opposite directions and can therefore be said to be counter-rotating. The crankpin 44, assuming that it has an axial offset "r" from the crankshaft 46, causes a reciprocating linear motion of the shuttle of magnitude 2r, ranging from −r to +r.

As the crankshaft 46 rotates, the lubricating fluid travels through the gallery 110, is diverted to an outer surface 126 of the crankpin 44 through the bore 114 lubricating the interface between the outer surface 126 of the crankpin 44 and the bearing portion 66 of the conjugate driver 54 and through the bore 116 lubricating the interface between the outer surface 126 of the crankpin 44 and the bearing portion 68 of the conjugate driver 56. As the orifice 120 of the conjugate driver 56 comes into alignment with the bore 116 (see FIG. 5), lubricating fluid flows from the bore 116 into the orifice 120. As the mating profile 60 of the bearing conjugate 50 engages the tracking profile 64 of the conjugate driver 56, the mating profile 60 pushes a portion of lubricating fluid, which is conveyed through the orifice 120 to an area on the tracking profile 64 adjacent to the orifice 120, into the channels 124 and, thereby, induces the transfer of lubricating fluid to other areas of the tracking profile 64 remote from the area adjacent to the orifice 120. In this way, the entire interface between the tracking profile 64 of the conjugate driver 56 and the mating profile 60 of the bearing conjugate 50 is effectively and efficiently lubricated.

As the crankshaft 46 continues its rotating motion, the bore 114 comes into alignment with the orifice 118 of the conjugate driver 54 so that lubricating fluid flows from the bore 114 into the orifice 118. As the mating profile 58 of the bearing conjugate 48 engages the tracking profile 62 of the conjugate driver 54, the mating profile 58 pushes a portion of lubricating fluid, which is conveyed through the orifice 118 to an area on the tracking profile 62 adjacent to the orifice 118, into the channels 122 and, thereby, induces the transfer of lubricating fluid to other areas of the tracking profile 62 remote from the area adjacent to the orifice 118. In this way, the entire interface between the tracking profile 62 of the conjugate driver 54 and the mating profile 58 of the bearing conjugate 48 is effectively and efficiently lubricated.

The present invention provides certain functional advantages over a roller bearing or a slider shoe riding upon a flat surface or more traditional gear shapes as shown in the patents discussed above. As can be appreciated in FIGS. 2-5, the mating profiles 58, 60 of the bearing conjugates 48, 50, respectively, and the tracking profiles 62, 64 of the conjugate drivers 54, 56, respectively, substantially increase the area of contact between the conjugate drivers 54, 56 and the bearing conjugates 48, 50 over the line contact of a roller bearing (or wheel) on a flat, hard surface. In addition, the overhanging portions 72, 76 of the tracking profiles 62, 64, respectively, further increase the area of contract between the conjugate drivers 54, 56 and the bearing conjugates 48, 50, respectively. Thus, the present invention has the capacity to endure greater normal loading forces, thereby increasing its power density. The wave-profile arrangement depicted herein can support greater loading forces directed along a line perpendicular to the pitch line than gear shapes which are intended to transfer torsional forces acting parallel to the pitch line.

The lubrication system described herein reduces friction at the interface between the bearing conjugates 48, 50 and the conjugate drivers 54, 56, respectively, and between the crankpin 44 and the conjugate drivers 54, 56, respectively. It should be appreciated that the lubrication system also contributes in minimizing backlash by creating a thin film of lubricating fluid between the conjugate drivers 54, 56 and the bearing conjugates 48, 50, respectively, thereby compensating for inadvertent gaps and spaces resulting from manufacturing tolerances and/or wear and tear of the conjugate drive mechanism.

It should also be appreciated that the end retaining walls 86, 90 and side retaining walls 94, 98 of the conjugate drivers 54, 56, respectively, and the side retaining walls 106, 108 of the bearing conjugates 48, 50, respectively, further contribute in minimizing backlash, brinelling, spalling and vibration. The side retaining wall 94 and the end retaining wall 86 of the conjugate driver 54 and the side retaining wall 106 of the bearing conjugate 48 cooperate to form a labyrinth enclosure, while the side retaining wall 98 and the end retaining wall 90 of the conjugate driver 56 and the side retaining wall 108 of the bearing conjugate 50 cooperate to form a labyrinth enclosure. The labyrinth enclosures temporarily collect and retain lubricating fluid therein to create a pooling effect by forming a hydrostatic cushion of lubricating fluid between the mating profile 58 of the bearing conjugate 48 and the tracking profile 62 of the conjugate driver 54 and between the mating profile 60 of the bearing conjugate 50 and the tracking profile 64 of the conjugate driver 56. The hydrostatic cushion created by the labyrinth enclosures results in minimized physical contact between the mating profile 58 of the bearing conjugate 48 and the tracking profile 62 of the conjugate driver 54 and between the mating profile 60 of the bearing conjugate 50 and the tracking profile 64 of the conjugate driver 56.

It should also be noted that the end retaining walls 86, 90 may be designed in such a way that they function as motion arresters in accordance with the teachings of applicant's copending U.S. patent application Ser. No. 08/148,492, filed Nov. 8, 1993, the specification of which is incorporated herein by reference. Thus, the end retaining wall 86 may function to arrest the motion of the conjugate driver 54 within a pre-defined range of motion of the conjugate driver 54 relative to the bearing conjugate 48 about the crankpin 44, the range being delimited by two end points, the two end points being defined when the lateral ends 88 of the conjugate driver 54 engage the mating profile 58 of the bearing conjugate 48. Likewise, the end retaining wall 90 may function to arrest the motion of the conjugate driver 56 within a pre-defined range of motion of the conjugate driver 56 relative to the bearing conjugate 50 about the crankpin 44, the range being delimited by two end points, the two end points being defined when the lateral ends 92 of the conjugate driver 56 engage the mating profile 60 of the bearing conjugate 50. In other words, the end retaining wall 86 inhibits the conjugate driver 54 from moving beyond one of its end points, while the end retaining wall 90 inhibits the conjugate driver 56 from moving beyond one of its end points. As a result, the end retaining walls 86, 90 reduce backlash and scuffing when the conjugate drivers 54, 56 reach such end points.

After all various embodiments of the present invention are considered below, it should be apparent that the bearing conjugates 48, 50 and the conjugate drivers 54, 56 can be configured in a variety of ways. In each instance, however, it is an objective to prevent scuffing, to minimize backlash and to provide an adequate load bearing support surface. Scuffing of the surfaces is avoided when the tracking profiles 62, 64 of the conjugate drivers 54, 56, respectively, track along the mating profiles 58, 60 of the bearing conjugates 48, 50, respectively, without loss of contact or slippage throughout the range of motion of the device. In addition, one can observe that the total circumferential length of the mating profiles 58, 60 of the bearing conjugates 48, 50, respectively, equals the total circumferential length of the tracking profiles 62, 64 of the corresponding conjugate drivers 54, 56, respectively.

The bearing conjugates 48, 50 and the conjugate drivers 54, 56 may be formed of hardened steel or other materials as commonly used to form gears and may include surface treatments to reduce wear, friction and production costs (e.g., electroplating, nitriding, spray dispersement and, in general, any known metallurgical or coating process). The weight of the bearing conjugates 48, 50 and conjugate drivers 54, 56 could be reduced by forming them as a multi-material matrix of aluminum and steel or other metal or non-metal matter. The bearing portions 62, 64 of the conjugate drivers 54, 56 may be similarly enhanced by surface treatment or bonding with a friction-reducing bearing material. Furthermore, the mating profiles 58, 60 of the bearing conjugates 48, 50, respectively, and/or tracking profiles 62, 64 of the conjugate drivers 54, 56, respectively, can be lapped (e.g., by roughing the mating profiles 58, 60 and/or tracking profiles 62, 64 so as to provide them with microscopic pores) such that-lubricating fluid supplied though the orifices 118, 120, respectively, can readily adhere to the mating profiles 58, 60 and/or the tracking profiles 62, 64 to create a thin film of lubricating fluid between the mating profiles 58, 60 and the tracking profiles 62, 64, respectively.

It should be apparent that the lubrication system also can be configured in various alternative ways. For example, the orifices 118, 120 may communicate with the valleys of the undulations of the tracking profiles 62, 64, rather than with their peaks as shown in FIGS. 1 and 6. The orifices 118, 120 may also extend through the conjugate drivers intermediate the opposed lateral ends 88, 92 of the conjugate drivers 54, 56, respectively, rather than adjacent one of the lateral ends 88, 92, as shown in FIGS. 1 and 6. In addition, the lubrication system can be configured in such a way that a continuous, rather than intermittent, flow of lubricating fluid is provided to the interfaces between the conjugate drivers 54, 56, respectively, and the bearing conjugates 48, 50, respectively, or in such a way that the interface between the conjugate driver 54 and the bearing conjugate 48 and the interface between the conjugate driver 56 and the bearing conjugate 50 are lubricated simultaneously, rather than sequentially.

One should further note that the shuttle 34 is confined to a rectilinear path by the cylinders 16, 18 and the pistons 26, 28. In addition, independent guides 128, 130 may act upon the shuttle 34 proximate the yoke portion 40 to further insure the rectilinear motion of the shuttle 34 and to relieve the pistons 26, 28 and cylinders 16, 18 from undesired side loading forces. However, the shuttle 34 may be confined to a rectilinear path only by the cylinders 16, 18 and the pistons 26, 28. Furthermore, the tracking profiles 62, 64 of the conjugate drivers 54, 56, respectively, act as self-aligning interfaces as they mesh with their respective bearing conjugates 48, 50. Of course, the motion conversion apparatus of the present invention could be used on any application requiring conversion between rotary and linear reciprocating motion and, on those applications not requiring pistons, the guides 128, 130 may be provided.

The shuttle 34 may also be formed of hardened steel or other materials as commonly used to form shuttles. The weight of the shuttle 34 could be reduced by forming them as a multi-material matrix of aluminum and steel or other metal or non-metal matter.

Figure 8:
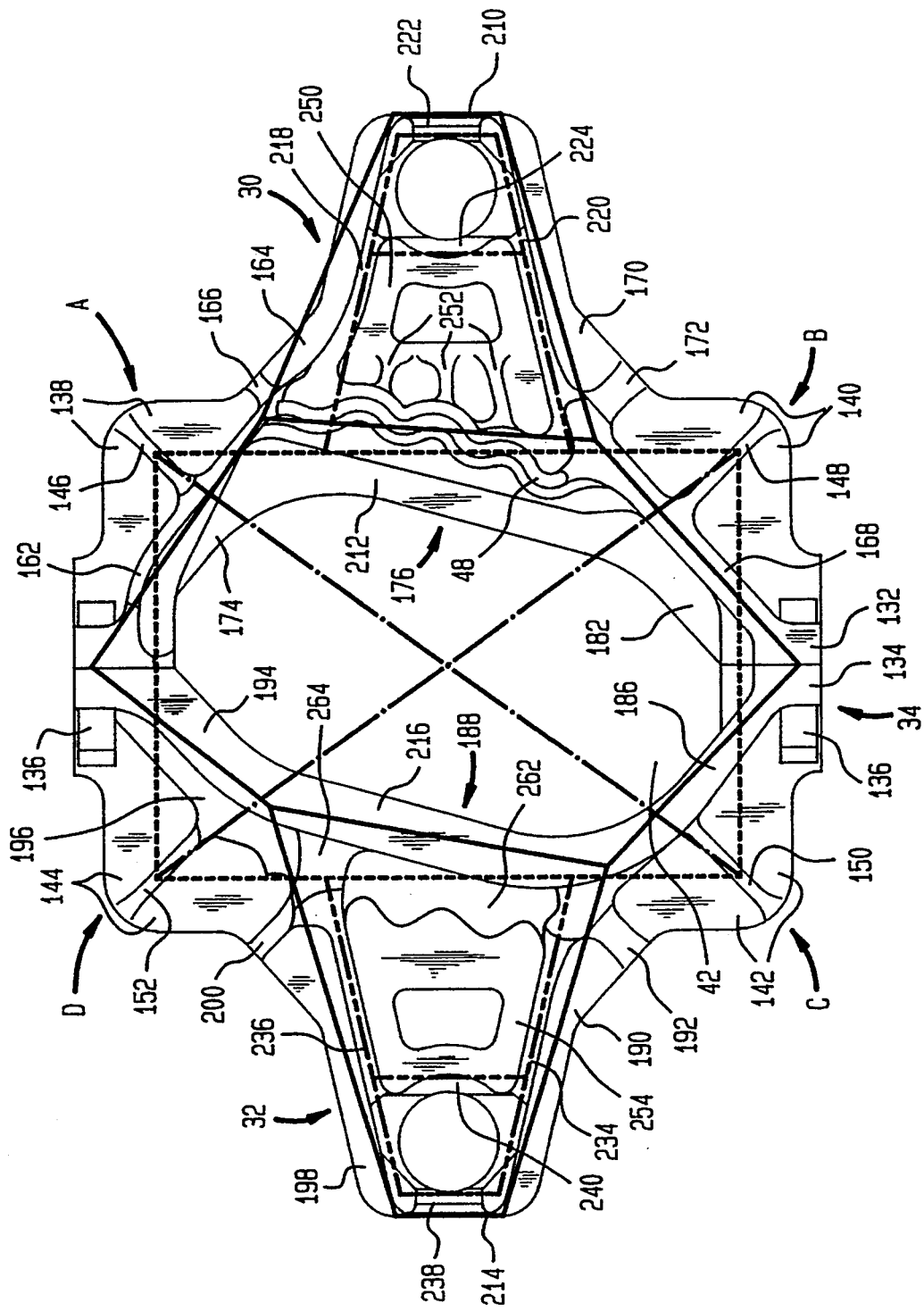
FIG. 8 is a side elevational view of a shuttle employed by the embodiment illustrated in FIG. 1.

Referring to FIGS. 8 and 9, the shuttle 34 is constructed of ribs and webs forming a plurality of frames on a pair of subunits 132, 134, securely connected by bolts 138 or any other conventional means, to reinforce the shuttle 34 and to thereby increase the load bearing capacity of the shuttle 34. The shuttle 34 has a box frame (illustrated by broken lines of equal length), positioned at the yoke portion 40 thereof and between front and rear sides thereof, the front side (being shown in FIG. 8) facing the open side of the piston device 10 shown in FIG. 1, the rear side (being shown in FIG. 9) facing the closed side of the piston device 10 shown in FIG. 1. The box frame is defined by a plurality of webs 138, 140, 142, 144, each of the webs 138, 140, 142, 144 defining one of the corners of the box frame (indicated by arrows A, B, C and D, respectively).

The shuttle 34 also includes a pair of partial X frames (illustrated by alternating dots and lines) at the yoke portion 40 thereof. One of the partial X frames (see FIG. 8) is positioned between the box frame and the front side, the one partial X frame being defined by ribs 146, 148, 150, 152. The rib 146 extends from the web 138 to the front side, the rib 148 extends from the web 140 to the front side, the rib 150 extends from the web 142 to the front side, and the rib 152 extends from the web 144 to the front side. Another partial X frame (see FIG. 9) is positioned between the box frame and the rear side and is defined by ribs 154, 156, 158, 160. The rib 154 extends from the web 138 to the rear side, the rib 156 extends from the web 140 to the rear side, the rib 158 extends from the web 142 to the rear side, and the rib 160 extends from the web 144 to the rear side.

The shuttle 34 further includes a plurality of large A frames (illustrated by solid lines). One of the large A frames (see FIG. 8) is positioned on the subunit 132 and includes a pair of legs. One leg is defined by a rib 162 connected to the web 138 and the rib 146 and defining a portion of the aperture 42 and by a web 164 on an outer periphery of the terminal end of the extension 30, the rib 162 being connected to a rib 166 which interconnects the web 138 and the web 164. The other leg is defined by a rib 168 connected to the web 140 and the rib 148 and defining a portion of the aperture 42 and by a web 170 on the outer periphery of the terminal end of the extension 30, the rib 168 being connected to a rib 172 which interconnects the web 140 and the web 170.

Another large A frame (see FIG. 9) is positioned on the subunit 132 and includes a pair of legs. One leg is defined by an end 174 of a web 176 defining a portion of the aperture 42, the end 174 being connected to a rib 178 which is connected to the web 138 and the rib 154, and by the web 164 connected to a rib 180 which is connected to the web 138 and the rib 178. The other leg is defined by an another end 182 of the web 176 connected to the web 140 and the rib 156 and by the web 170 on the outer periphery of the terminal end of the extension 30, the web 170 being connected to a rib 184 which is connected to the web 140.

Another large A frame (see FIG. 8) is positioned on the subunit 134 and includes a pair of legs. One leg is defined by an end 186 of a web 188 defining a portion-of the aperture 42, the end 186 being connected to the web 142 and the rib 150, and a web 190 on an outer periphery of the terminal end of the extension 32, the web 190 being connected to a rib 192 which is connected to the web 142. The other leg is defined by an another end 194 of the web 188, the end 194 being connected to a rib 196 which is connected to the web 144 and the rib 152, and by a web 198 on the outer periphery of the terminal end of the extension 32, the rib 198 being connected to a rib 200 which is connected to the web 144.

Another large A frame (see FIG. 9) is positioned on the subunit 134 and includes a pair of legs. One leg is defined by a rib 202 connected to the web 142 and the rib 158 and defining a portion of the aperture 42 and by the web 190 connected to a rib 204 which is connected to the web 142. The other leg is defined by a rib 206 connected to the web 144 and the rib 160 and defining a portion of the aperture 42 and by the web 198 on the outer periphery of the terminal end of the extension 32, the web 198 being connected to a rib 208 which is connected to the web 144.

The large A frame which is positioned on the subunit 132 (see FIG. 8) includes an exterior roof which is defined by a web 210 formed on the outer periphery of the terminal end of the extension 30, the web 210 connecting the web 164 and the web 170, and an intermediate roof which is defined by the bearing conjugate 48. The large A frame which is positioned on the subunit 132 (see FIG. 9) includes an exterior roof which is defined by the web 210 and an intermediate roof which is defined by a middle portion 212 of the web 176. The large A frame which is positioned on the subunit 134 (see FIG. 8) includes an exterior roof which is defined by a web 214 formed on the outer periphery of the terminal end of the extension 32, the web 214 connecting the web 190 and the web 198, and an intermediate roof which is defined a middle portion 216 of the web 188. The large A frame which is positioned on the subunit 134 (see FIG. 9) includes an exterior roof which is defined by the web 214 and an intermediate roof which is defined by the bearing conjugate 50.

The shuttle also includes a plurality of small A frames (illustrated by alternating sequence of two short lines and a long line). One of the small A frames (see FIG. 8) is positioned on the terminal end of the extension 30. This small A frame has a pair of legs defined by ribs 218, 220 which are connected to the webs 164, 170, respectively, an exterior roof defined by a rib 222 connected to the web 210 and an intermediate roof defined by a rib 224 interconnecting the webs 164, 170.

Another small A frame (see FIG. 9) is positioned on the terminal end of the extension 30. This small A frame has a pair of legs defined by ribs 226, 228 which are connected to the webs 164, 170, respectively, an exterior roof defined by a rib 230 connected to the web 210 and an intermediate roof defined by a rib 232 interconnecting the webs 164, 170.

Another small A frame (see FIG. 8) is positioned on the terminal end of the extension 32. This small A frame has a pair of legs defined by ribs 234, 236 which are connected to the webs 190, 198, respectively, an exterior roof defined by a rib 238 connected to the web 214 and an intermediate roof defined by a rib 240 interconnecting the webs 190, 198.

Another small A frame (see FIG. 9) is positioned on the terminal end of the extension 32. This small A frame has a pair of legs defined by ribs 242, 244 which are connected to the webs 190, 198, respectively, an exterior roof defined by a rib 246 connected to the web 214 and an intermediate roof defined by a rib 248 interconnecting the webs 190, 198.

In addition to the frames, the shuttle 34 has ribs and webs which function to further reinforce the shuttle 34. For example, a web 250 positioned between the ribs 218, 220 (see FIG. 8), between the ribs 226, 228 (see FIG. 9) and between the rib 224 and the bearing conjugate 48 includes a plurality of ribs 252 connected to the bearing conjugate 48 for reinforcing the bearing conjugate 48. A web 254 positioned between the ribs 234, 236 (see FIG. 8), between the ribs 242, 244 (see FIG. 9) and between the rib 240 and the bearing conjugate 50 includes a plurality of ribs 256 connected to the bearing conjugate 50 for reinforcing the bearing conjugate 50. A rib 258 (see FIG. 9) is positioned between the webs 176, 250 and connected to the webs 176, 250. A rib 260 (see FIG. 9) interconnects the ribs 178, 258 and is connected to the ribs 180, 226. A rib 262 (see FIG. 9) is positioned between the webs 188, 254 and connected to the webs 188, 254. A rib 264 (see FIG. 9) interconnects the ribs 196, 262 and is connected to the ribs 200, 236.

It should be apparent that the rib/web construction of the shuttle 34 can be configured in a variety of ways, and the present invention is not limited to any particular form of the rib/web construction. For example, the ribs and/or webs which are connected to each other may be integrated with each other. In each instance, however, the objective of the rib/web construction of the shuttle 34 is to provide an adequate load bearing support for the shuttle 34.

Figure 10:
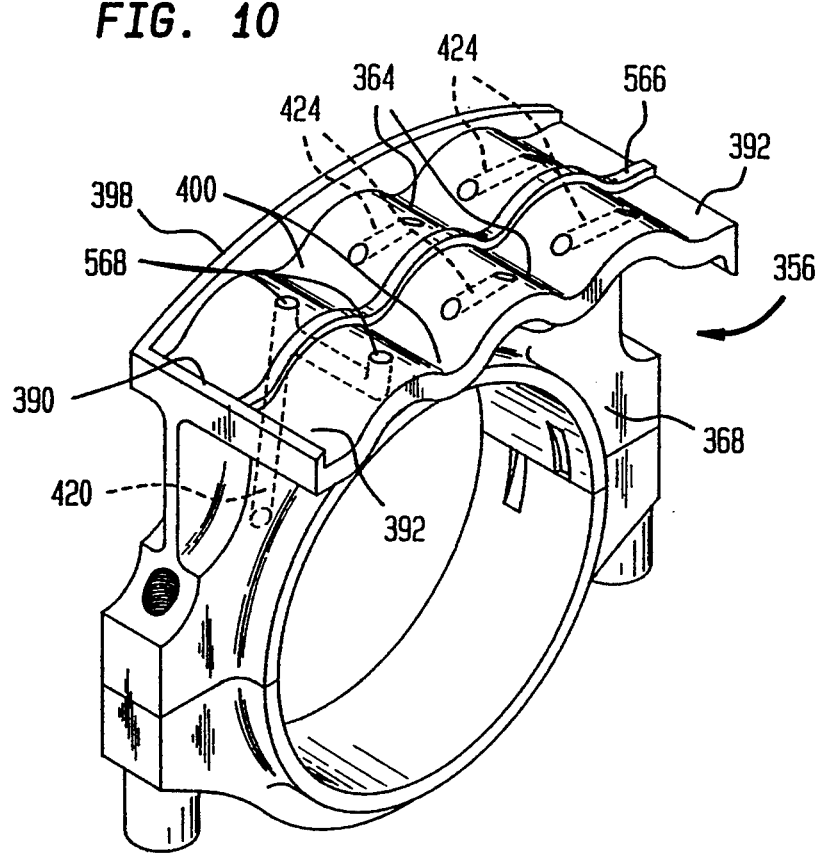
FIG. 10 is a perspective view of a modified version of the conjugate driver illustrated in FIG. 6.
Figure 11:
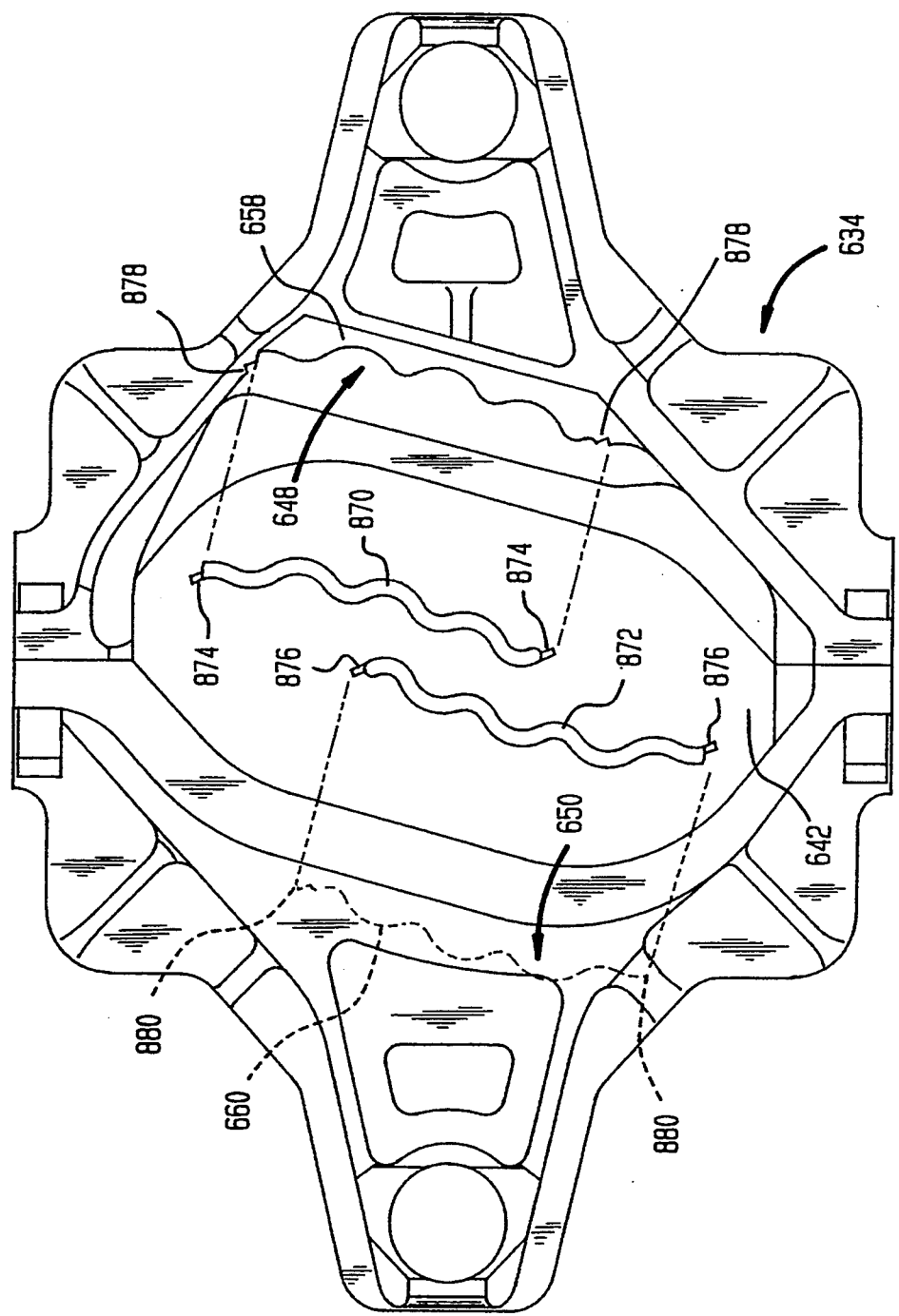
FIG. 11 is a partially exploded, side elevational view of a modified version of the shuttle illustrated in FIGS. 8 and 9.
Figure 12:
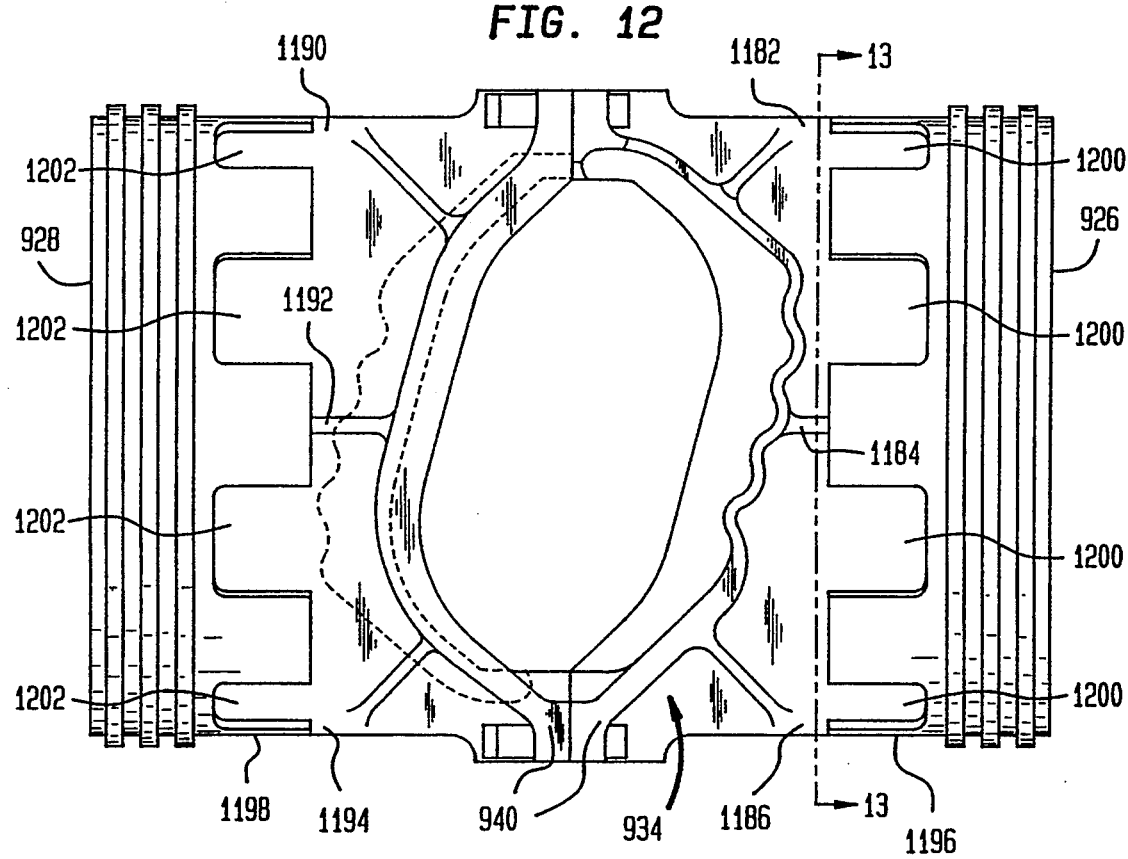
FIG. 12 is a side elevational view of another modified version of the shuttle illustrated in FIGS. 8 and 9.
Figure 13:
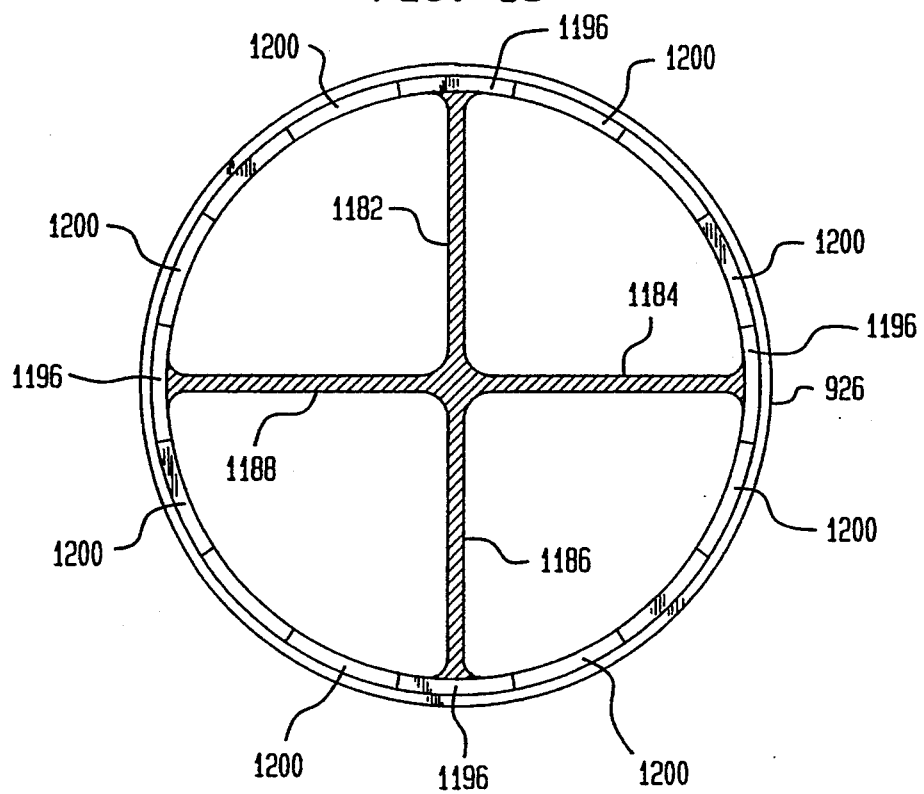
FIG. 13 is a cross-sectional view, taken along section line 13-13 of FIG. 12 and looking in the direction of the arrows, of the shuttle illustrated in FIG. 12.

FIG. 10 shows a modified version of the conjugate driver illustrated in FIGS. 1–7. FIG. 11 shows a modified version of the shuttle shown in FIGS. 1–5, 8 and 9, while FIGS. 12 and 13 show a modified version of the shuttle shown in FIGS. 1–5, 8 and 9. In FIGS. 10–13, a numbering convention is employed wherein elements shown therein having a function or structure in common with a counterpart in previously discussed in FIGS. 1–9 are given the same number incremented by 300 in each succeeding embodiment.

Referring to FIG. 10, a tracking profile 364 of a conjugate driver 356 includes an end retaining wall 390 at one of lateral ends 392 thereof, while an associated bearing conjugate (not shown) is equipped with a groove to receive the end retaining wall 390. The tracking profile 364 of the conjugate driver 356 also includes a side retaining wall 398 at one of two opposed axial ends 400 such that when the conjugate driver 356 is in engagement with the associated bearing conjugate, at least some portion of the side retaining wall 398 is in engagement with a side of the associated bearing conjugate to guide the conjugate driver 356 in alignment with an associated shuttle throughout the range of motion of a piston device.

The conjugate driver 356 also includes an intermediate side retaining wall 566, positioned intermediate the opposed axial ends 400 of the conjugate driver 356 while the associated bearing conjugates includes a complimentarily shaped groove to receive the intermediate side retaining wall 566. A pair of outlets 568 for conveying lubricating fluid from an orifice 420 to a tracking profile 364 of the conjugate driver 356 as the conjugate driver 356 rotates about a crankpin (not shown), the orifice 420 extending from a bearing portion 368 of the conjugate driver 356 to the tracking profile 364, is formed on the tracking profile 364, one on each side adjacent to the intermediate side retaining wall 566. In addition, the conjugate driver 356 also includes a plurality of channels on each side adjacent to the intermediate side retaining wall 566, the channels interconnecting valleys of undulations of the tracking profile 364.

A pair of labyrinth enclosures are formed on the tracking profile 366, one of the enclosures being defined by the side retaining wall 398, the intermediate side retaining wall 566 and the end retaining wall 390, while another of the enclosures is defined by the intermediate side retaining wall 566, the end retaining wall 390 and a side retaining wall of the associated bearing conjugate. This double labyrinth enclosure configuration of the conjugate driver 356 enhances a pooling effect whereby lubricating fluid is temporarily collected in and retained by the enclosures to form a hydrostatic cushion of lubricating fluid between a mating profile of the associated bearing conjugate and the tracking profile 364 of the conjugate driver 356 such that physical contact between the mating profile of the associated bearing conjugate and the tracking profile 364 of the conjugate driver 356 is minimized.

It should be apparent that the conjugate driver 356 and its associated bearing conjugate can be configured in a variety of ways. For example, the tracking profile 364 may have a pair of side retaining walls, one on each of the opposed axial ends 400 thereof. The conjugate driver 356 may also be equipped with a pair of end retaining walls formed on the opposed lateral ends 392 of the tracking profile 364 to further increase the pooling effect described above and to thereby further minimize backlash. In addition, one or more intermediate end retaining walls may be placed on the tracking profiles 364 of the conjugate driver 356, intermediate the opposed lateral ends 392 of the tracking profile 364, while the associated bearing conjugate is equipped with one or more grooves to receive the end retaining walls.

Referring to FIG. 11, bearing inserts 870, 872 which are complimentarily shaped to mating profiles 658, 660 of bearing conjugates 648, 650, respectively, are positioned on top of the bearing conjugates 648, 650, respectively, the bearing inserts 870, 872, being securely held by tabs 874, 876, respectively, of the bearing inserts 870, 872, respectively, placed in cavities 878, 880, respectively, on a outer periphery of an aperture 642 of a shuttle 634. Associated conjugate drivers engage the bearing inserts 870, 872 as a crankpin rotates and bear against the bearing inserts 870, 872, instead of bearing directly to the bearing conjugates 648, 650. The bearing inserts 870, 872 can be removable from the shuttle 634 so that the bearing inserts 870, 872 can be removed for repair, replacement, etc. The bearing inserts 870, 872 can also be made adjustable by any conventional means to compensate for any wear of the bearing inserts 870, 872, bearing conjugates 648, 660 and/or the associated conjugate drivers.

FIG. 12 shows castled pistons, 926, 928 which are formed monolithically with a shuttle 934. More particularly, the piston 926 is mounted on the shuttle 934 via members 1182, 1184, 1186, 1188 which are merged with each other at a center and which are integrated to the piston 926 and to the shuttle 934, while the piston 928 is mounted on the shuttle 934 via members (one of which is not shown) 1190, 1192, 1194 which are merged with each other at a center and which are integrated to the piston 928 and to the shuttle 934. The pistons 926, 928 have skirt portions 1196, 1198, respectively, which are adjacent to a common yoke portion 940 of the shuttle 934 when the pistons 926, 928 are mounted on the shuttle 934. The skirt portions 1196, 1198 have a plurality of evenly spaced cutouts 1200, 1202, respectively, around peripheries of the pistons 926, 928, respectively.

It should be noted that, because pistons undergo great stress during the operation of an engine, pistons have to be not only strong and rigid but also light to reduce inertia losses and inertia loads on the bearings. The castled pistons 926, 928 achieve the above objective. The cutouts 1200, 1202 reduce the overall weight of the pistons 926, 928, while the overall weight of the shuttle 934 is reduced by the use of the integrated members to mount the pistons 926, 928 to the shuttle 934. The cutouts 1200, 1202 also allow the thermal expansion of the pistons 926, 928 to be better controlled and regulated.

It will be understood that the embodiments described herein are merely exemplary and that a person skilled in the art may make many variations and modifications without departing from the spirit and scope of the invention. For example, the side retaining wall, intermediate side retaining wall, end retaining wall of a conjugate driver may be placed on the mating profile of an associated bearing conjugate rather than on the tracking profile of the conjugate driver. All such variations and modifications are intended to be included within the scope of the invention as defined in the appended claims.

I claim:

1. A motion converter apparatus, comprising a shuttle movable in a reciprocating fashion along a rectilinear path, said shuttle having an aperture therein, one side of said aperture being defined by a first trackable profile and an opposite side of said aperture being defined by a second trackable profile; a rotatable crankshaft having a crankpin positioned within said aperture of said shuttle and rotatable in a circular path; a pair of conjugate drivers rotatably mounted on said crankpin by a corresponding pair of mounting means positioned on opposite sides of an imaginary plane which passes through said crankpin and which is oriented normal to a longitudinal axis of said crankpin, one of said conjugate drivers including a first tracking profile having a first profiled portion positioned on one side of said imaginary plane and a second profiled portion positioned on an opposite side of said imaginary plane, whereby said second profiled portion of said first tracking profile overhangs the other of said conjugate drivers, said other conjugate driver including a second tracking profile having a first profiled portion positioned on said opposite side of said imaginary plane and a second profiled portion positioned on said one side of said imaginary plane, whereby said second profiled portion of said second tracking profile overhangs said one conjugate driver, said first and second tracking profiles engaging said first and second trackable profiles, respectively, in a continuous conjugating manner as said crankpin rotates in said circular path, whereby the reciprocating rectilinear motion of said shuttle is continuously converted into the rotary motion of said crankpin or vice versa.

2. The motion converter apparatus of claim 1, wherein said first trackable profile extends on both sides of said imaginary plane and said second trackable profile extends on both sides of said imaginary plane.

3. The motion converter apparatus of claim 2, further comprising first conveying means for conveying lubricating fluid from a source of pressurized lubricating fluid to an interface between said first trackable profile and said first tracking profile and second conveying means for conveying lubricating fluid from said source of pressurized lubricating fluid to an interface between said second trackable profile and said second tracking profile.

4. The motion converter apparatus of claim 3, wherein each of said first and second trackable profiles is lapped to thereby enhance its ability to retain said lubricating fluid and wherein each of said tracking profiles is lapped to thereby enhance its ability to retain said lubricating fluid.

5. The motion converter apparatus of claim 3, further comprising first retaining means for retaining said lubricating fluid between said first trackable profile and said first tracking profile and second retaining means for retaining said lubricating fluid between said second trackable profile and said second tracking profile.

6. The motion converter apparatus of claim 5, wherein said first retaining means includes a first retaining wall provided on said one conjugate driver and extending along one side thereof, a second retaining wall provided on said shuttle and extending alongside and adjacent to an opposite side of said one conjugate driver, and a third retaining wall provided on said one conjugate driver and extending along one end thereof.

7. The motion converter apparatus of claim 6, wherein said second retaining means includes a fourth retaining wall provided on said other conjugate driver and extending along one side thereof, a fifth retaining wall provided on said shuttle and extending alongside and adjacent to an opposite side of said other conjugate driver, and a sixth retaining wall provided on said other conjugate driver and extending along one end thereof.

8. The motion converter apparatus of claim 1, wherein said shuttle includes reinforcing means for reinforcing said shuttle, said reinforcing means including a plurality of ribs and webs which cooperate to form a box frame in a central region of said shuttle, a first pair of A frames at one end of said shuttle and a second pair of A frames at an opposite end of said shuttle.

9. The motion converter apparatus of claim 1, wherein said shuttle includes a first castled piston formed monolithically with said shuttle at one end thereof and a second castled piston formed monolithically with said shuttle at an opposite end thereof.

10. A lubrication system for a conjugate drive mechanism of a scotch yoke type motion converter, comprising a linearly movable shuttle; a crankpin positioned within an aperture in said shuttle and rotatable in a circular path; a bearing conjugate forming a portion of a peripheral boundary of said aperture; a conjugate driver positioned within said aperture and rotatably mounted about said crankpin, at least a portion of said conjugate driver being located between said crankpin and said bearing conjugate, said conjugate driver and said bearing conjugate engaging each other continuously in conjugation as said crankpin rotates such that motion is transferable between said crankpin and said shuttle; conveying means for conveying lubricating fluid from a source of pressurized lubricating fluid to an interface between said bearing conjugate and said conjugate driver; and retaining means for retaining said lubricating fluid between said bearing conjugate and said conjugate driver.

11. The lubrication system of claim 10, wherein said conveying means includes a gallery extending in a generally axial direction through said crankpin, said gallery communicating with said source of pressurized lubricating fluid, and a passageway extending through said conjugate driver, said passageway having an inlet provided on a first surface of said conjugate driver adjacent to said crankpin and an outlet provided on a second surface of said conjugate driver adjacent to said bearing conjugate.

12. The lubrication system of claim 11, wherein said second surface of said conjugate driver has a series of peaks and valleys, said second surface being lapped to thereby enhance its ability to retain said lubricating fluid.

13. The lubrication system of claim 12, wherein said conveying means includes a channel extending through one of said peaks, said channel having a first discharge end communicating with a first valley positioned on one side of said one peak and a second discharge end communicating with a second valley positioned on an opposite side of said one peak, whereby said lubricating fluid can flow from said first valley to said second valley through said channel.

14. The lubrication system of claim 10, wherein said retaining means includes a first retaining wall provided on said conjugate driver and extending along one side thereof and a second retaining wall provided on said shuttle and extending alongside and adjacent to an opposite side of said conjugate driver.

15. The lubrication system of claim 14, wherein said retaining means includes a third retaining wall provided on said conjugate driver and extending along one end thereof.

16. The lubrication system of claim 15, wherein said retaining means includes a fourth retaining wall provided on said conjugate driver and extending therealong between said one side thereof and said opposite side thereof.

17. A shuttle for a conjugate drive mechanism of a scotch yoke type motion converter which includes a crankpin positioned within an aperture in said shuttle and rotatable in a circular path, a bearing conjugate forming a portion of a peripheral boundary of said aperture, a conjugate driver positioned within said aperture and rotatably mounted about said crankpin, at least a portion of said conjugate driver being located between said crankpin and said bearing conjugate, said conjugate driver and said bearing conjugate engaging each other continuously in conjugation as said crankpin rotates such that motion is transferable between said crankpin and said shuttle; said shuttle comprising reinforcing means for reinforcing said shuttle, said reinforcing means including a plurality of ribs and webs which cooperate to form a box frame in a central region of said shuttle, a first pair of A frames at one end of said shuttle and a second pair of A frames at an opposite end of said shuttle.

18. The shuttle of claim 17, wherein said ribs and webs of said reinforcing means cooperate to form a partial X-frame within said box frame.

* * * * *